(12) United States Patent
Arnold et al.

(10) Patent No.: US 7,295,015 B2
(45) Date of Patent: *Nov. 13, 2007

(54) IONIZATION GAUGE

(75) Inventors: Paul C. Arnold, Boulder, CO (US); Paul M. Rutt, Longmont, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/354,278

(22) Filed: Feb. 14, 2006

(65) Prior Publication Data

US 2006/0197537 A1 Sep. 7, 2006

Related U.S. Application Data

(63) Continuation-in-part of application No. 10/799,446, filed on Mar. 12, 2004, now Pat. No. 7,030,619, which is a continuation-in-part of application No. 10/782,368, filed on Feb. 19, 2004, now abandoned.

(51) Int. Cl.
*G01L 21/30* (2006.01)
*G01N 27/62* (2006.01)

(52) U.S. Cl. .................. 324/460; 324/464
(58) Field of Classification Search ........ 324/460, 324/464, 459; 250/305
See application file for complete search history.

(56) References Cited

U.S. PATENT DOCUMENTS

| | | | |
|---|---|---|---|
| 2,187,126 A | 1/1940 | Kern et al. | |
| 2,605,431 A | 7/1952 | Bayard | |
| 2,770,735 A | 11/1956 | Clemens et al. | |
| 2,937,295 A * | 5/1960 | Redhead | 313/7 |
| 2,990,493 A | 6/1961 | Seehof et al. | |
| 2,993,638 A * | 7/1961 | Helmer et al. | 417/49 |
| 3,211,937 A | 10/1965 | Hester et al. | |
| 3,312,855 A | 4/1967 | Melling | |

(Continued)

FOREIGN PATENT DOCUMENTS

DE 4219562 C1 7/1993

(Continued)

OTHER PUBLICATIONS

Author unknown, "Introduction to Bayard-Alpert Style Ionization Gauges," Granville-Phillips, 1999, XP-002375869, retrieved from the Internet: http://www.helixtechnology.com.cn/pdfs/GP/5_bagauges/Intro_to_BA_Gauges.pdf.

(Continued)

*Primary Examiner*—Anjan Deb
(74) *Attorney, Agent, or Firm*—Hamilton, Brook, Smith & Reynolds, P.C.

(57) ABSTRACT

An ionization gauge for isolating an electron source from gas molecules includes the electron source for generating electrons, a collector electrode for collecting ions formed by the impact between the electrons and gas molecules, and an electron window which isolates the electron source from the gas molecules. The ionization gauge can have an anode which defines an anode volume and decelerates and retains the electrons in a region of the anode. The ionization gauge can have a plurality of electron sources and/or collector electrodes. The collector electrode(s) are be located within the anode volume. The ionization gauge can be a Bayard-Alpert type that measures pressure.

20 Claims, 6 Drawing Sheets

U.S. PATENT DOCUMENTS

| | | |
|---|---|---|
| 3,319,318 A | 5/1967 | Taimuty |
| 3,353,048 A | 11/1967 | Hagenlocher et al. |
| 3,591,827 A | 7/1971 | Hall |
| 3,607,680 A | 9/1971 | Uno et al. |
| 3,624,391 A | 11/1971 | Davison |
| 3,670,172 A | 6/1972 | Golden |
| 4,104,647 A | 8/1978 | Sheldon |
| 4,494,036 A | 1/1985 | Neukermans |
| 4,988,871 A | 1/1991 | Gogol |
| 5,128,617 A | 7/1992 | Bills |
| 5,278,510 A * | 1/1994 | Baptist et al. ............. 324/460 |
| 5,378,957 A | 1/1995 | Kelly |
| 5,422,573 A | 6/1995 | Bills et al. |
| 5,561,342 A | 10/1996 | Roeder et al. |
| 5,834,768 A | 11/1998 | Outlaw et al. |
| 5,962,995 A | 10/1999 | Avnery |
| 6,002,202 A | 12/1999 | Meyer et al. |
| 6,023,169 A * | 2/2000 | Budovich et al. ........... 324/464 |
| 6,025,723 A | 2/2000 | Bills |
| 6,046,456 A | 4/2000 | Bills |
| 6,198,105 B1 | 3/2001 | Bills |
| 6,239,543 B1 | 5/2001 | Wakalopulos |
| 6,468,814 B1 | 10/2002 | Frees et al. |
| 6,566,884 B2 * | 5/2003 | Rutherford et al. ......... 324/460 |
| 7,030,619 B2 * | 4/2006 | Arnold et al. .............. 324/460 |

FOREIGN PATENT DOCUMENTS

| | | |
|---|---|---|
| EP | 0 646 283 B1 | 4/1995 |
| JP | 03135746 A | 6/1991 |
| WO | WO 93/26032 | 12/1993 |

OTHER PUBLICATIONS

Young, J.R., "Penetration of Electrons and Ions in Aluminum," Journal of Applied Physics, vol. 27, No. 1, Jan. 1956, pp. 1-4.

* cited by examiner

IONIZATION GAUGE

RELATED APPLICATION

This application is a continuation-in-part of U.S. application Ser. No. 10/799,446, filed Mar. 12, 2004, now U.S. Pat. No. 7,030,619 which is a continuation-in-part of U.S. application Ser. No. 10/782,368, filed Feb. 19, 2004; now abandoned the entire teachings of which are herein incorporated by reference.

BACKGROUND OF THE INVENTION

Ionization gauges, more specifically Bayard-Alpert (BA) ionization gauges, are the most common non-magnetic means of measuring very low pressures and have been widely used worldwide since being disclosed in U.S. Pat. No. 2,605,431 in 1952.

A typical ionization gauge includes an electron source, an anode, and an ion collector electrode. For the BA gauge, the electron source is located radially outside of an ionization space (anode volume) defined by the anode. The ion collector electrode is disposed within the anode volume. Electrons travel from the electron source toward and through the anode, and are eventually collected by the anode. However, in their travel, the electrons impact molecules and atoms of gas, constituting the atmosphere whose pressure is to be measured, and create ions. The ions are attracted to the ion collector electrode by the electric field inside the anode. The pressure of the gas within the atmosphere can be calculated from ion and electron currents by the formula $P=(1/S)(I_{ion}/I_{electron})$, where S is a constant with the units of 1/torr and is characteristic of a particular gauge geometry and electrical parameters.

SUMMARY OF THE INVENTION

The operational lifetime of a typical ionization gauge is approximately ten years when the gauge is operated in benign environments. However, these same gauges and electron sources (filaments) fail in minutes or hours when operated at too high a pressure or in gas types that degrade the emission characteristics of the electron source. Examples of such filament interactions leading to decreased operational lifetime range from degradation of the electron emission properties of the oxide coating on the filament to exposure to water vapor. Degradation of the oxide coating dramatically reduces the number of electrons generated by the filament, and exposure to water vapor results in the complete burnout of a tungsten filament.

Residual gas analyzers (RGA) are ionization gauges that determine the type of gas present and display the partial pressure of each gas type component which can also be compiled for a calculation of total gas pressure. RGAs measure the mass-to-charge ratio of ions present and convert the ratio to a signal. However, RGAs measure additional signal peaks that are entirely spurious to the gas species being detected. These peaks form a background spectrum that is significant in magnitude at the lower pressure ranges of a high vacuum. This spurious spectrum is caused by interaction of some atoms and/or molecules with the material of the filament, thus forming other compounds not originally in the gas phase.

There is provided an ionization gauge having an electron source for generating electrons, a collector electrode for collecting ions formed by the impact between the electrons and gas molecules, and an electron window which isolates the electron source from the gas molecules. The ionization gauge can have an anode which defines an anode volume and retains the electrons in a region of the anode. The ionization gauge can have a plurality of electron sources and/or collector electrodes. The collector electrode(s) can be located within the anode volume or outside the anode volume. The ionization gauge can have a mass filter for separating the ions based on mass-to-charge ratio. The ionization gauge can be a Bayard-Alpert type that measures pressure or a residual gas analyzer that also determines a gas type.

An acceleration electrode can be located between the electron source(s) and the electron window to accelerate the electrons to an energy which allows the electrons to be transmitted through the electron window. A deceleration electrode or anode can be located between the electron window and the collector electrode(s) to decelerate the electrons to the desired energy distribution to allow ion formation by the impact between the electrons and the gas molecules. The anode defining an anode volume can be between the deceleration electrode(s) and/or the collector electrode(s). A plurality of collector electrodes can be within the anode volume. A mass filter can be between the deceleration electrode(s) and the collector electrode(s).

The acceleration electrode is maintained at an electric potential so that the potential difference between the electron source(s) and the acceleration electrode is at a range of 100 volts to 10,000 volts. The electron window is at a potential comparable to the acceleration electrode potential. The deceleration electrode/anode can be maintained at an electric potential so that the potential difference between the electron window and the deceleration electrode/anode is at a range of 0 volt/180 volts to 10,000 volts. An outside collector electrode can be between the electron window and the deceleration electrode for collecting ions formed by the impact between the electrons and the gas molecules for high pressure conditions of very short mean free paths. The ionization gauge can include a plurality of outside collector electrodes, acceleration electrodes, and deceleration electrodes.

A shield can define a shielded volume so potentials external to the shield do not disturb the electric charge distribution within the shielded volume. The shield is at least partially open to permit transfer of the gas molecules into the shielded volume. The shielded volume houses the electron source(s), the collector electrode(s), and the electron window. The shield is maintained at a reference potential, where the reference potential can be ground potential.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
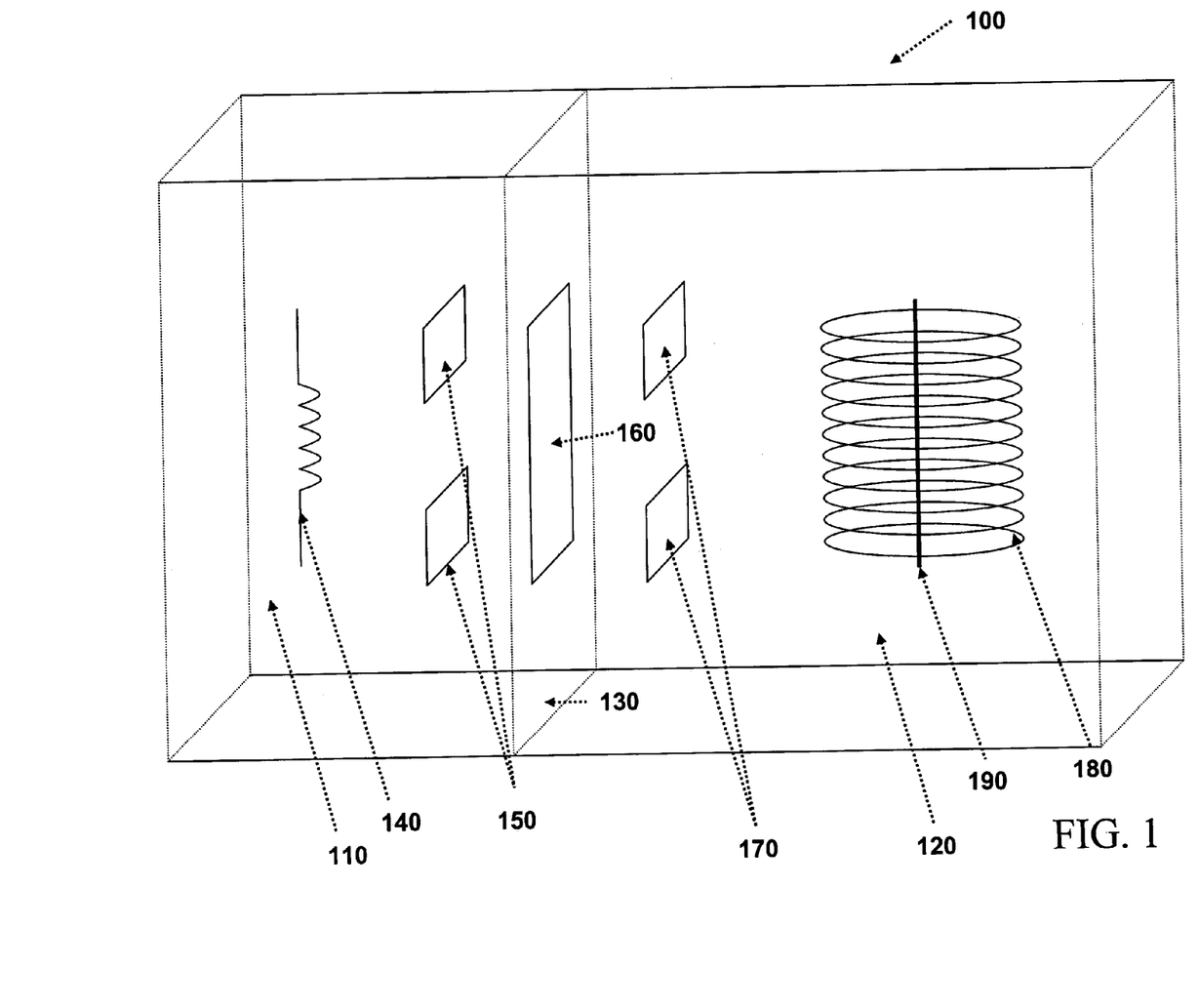
FIG. 1 is a schematic view of a generalized ionization gauge of the present invention.

Generally, as shown in FIG. 1, one ionization gauge 100 of the present invention has an isolation chamber 110 and a measurement chamber 120. The isolation chamber contains at least one electron source 140 and at least one acceleration electrode 150. The measurement chamber 120 contains at least one deceleration electrode 170, an anode 180, and at least one collector electrode 190. The two chambers 110, 120 are separated by an isolation material 130 which prevents molecules and atoms of gas within the measurement chamber 120 from entering the isolation chamber 110 and degrading the electron source(s) 140. The isolation material 130 has an electron window 160 which allows electrons to be transmitted from the isolation chamber 110 30 into the measurement chamber 120. Although the ionization gauge 100 is shown with an anode 180 and collector electrode 190, these components are not needed in all embodiments of the invention as described below. In one embodiment, the ionization gauge 100 is a Bayard-Alpert type gauge.

Figure 2A:
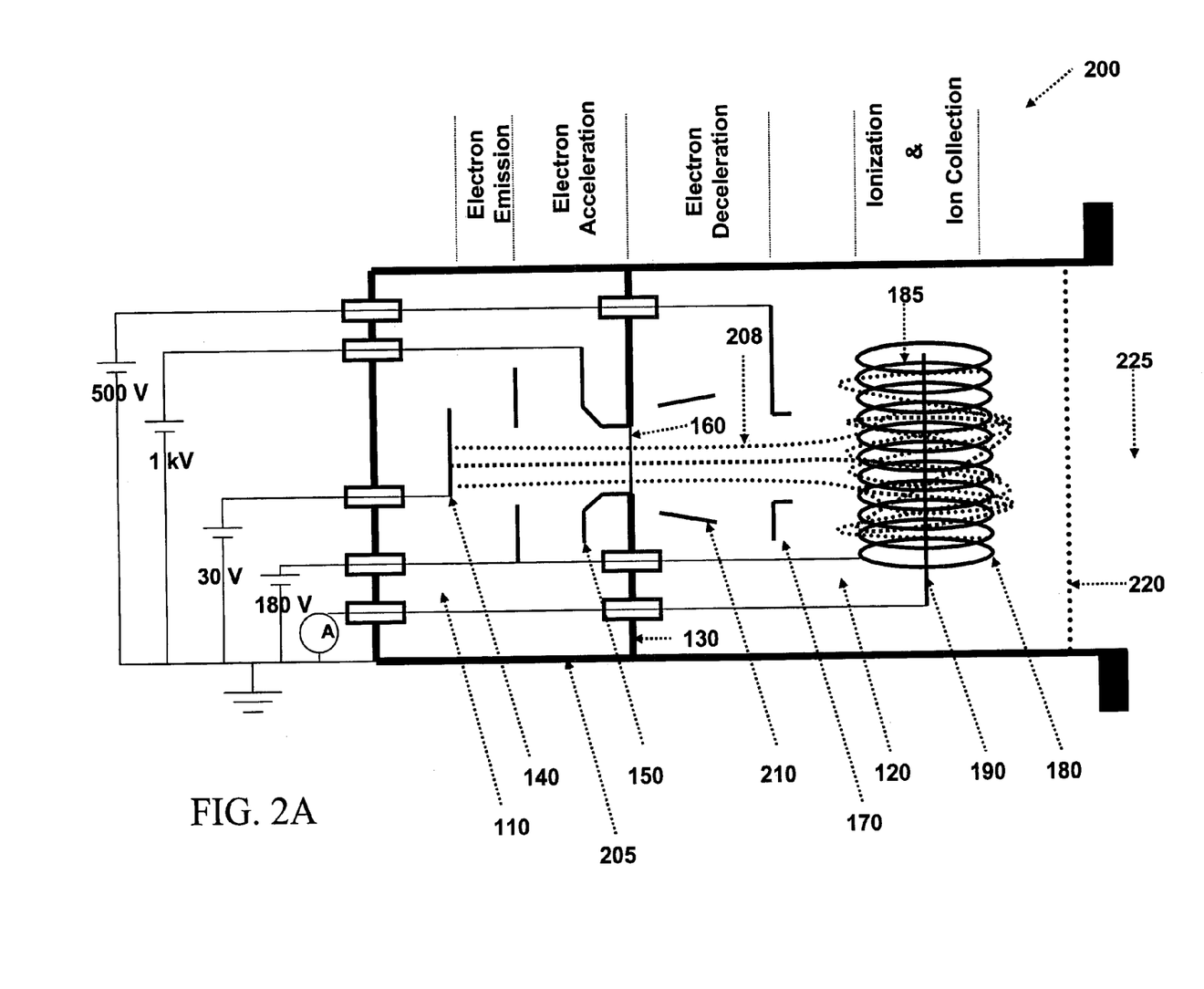
FIG. 2A is a detailed schematic view of a non-nude type ionization gauge of FIG. 1.

FIG. 2A shows a specific non-nude type ionization gauge 200 embodying the present invention. Although a non-nude type gauge is shown, it should be understood that a nude type ionization gauge can be employed using the principals of the present invention. The ionization gauge 200 has similar components to the ionization gauge 100 (FIG. 1) described above with the following additions. The ionization gauge 200 is housed in a tube 205 open at one end 225 to allow molecules and atoms of gas to enter the measurement chamber 120 through a shield 220. The shield 220 and tube 205 form a shield volume. At least one optional outside collector electrode 210 is added for high pressure measurements of very short mean free paths.

Figure 2B:
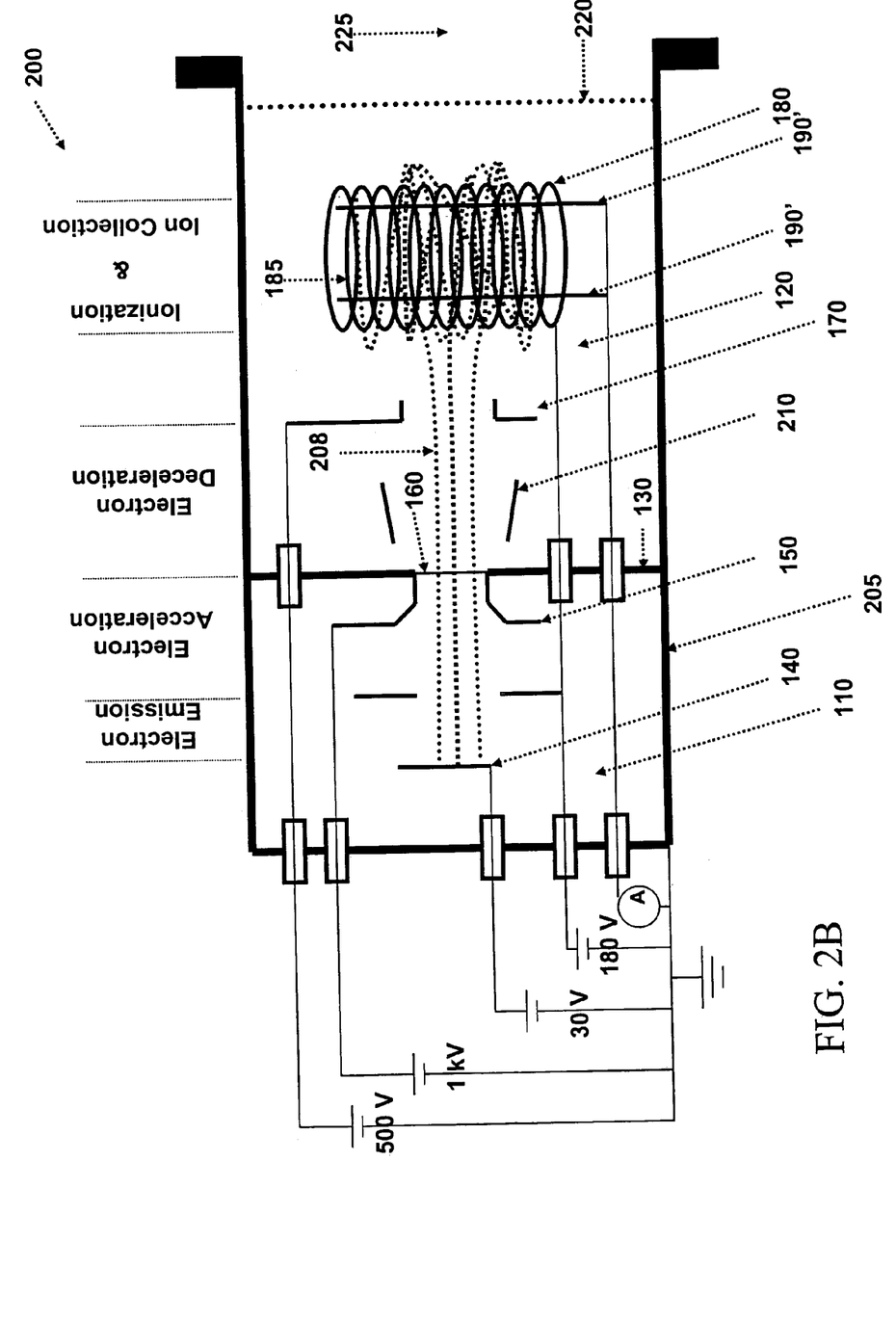
FIG. 2B is a detailed schematic view of another embodiment of FIG. 2A.

FIG. 2B shows another embodiment of the invention shown in FIG. 2A. A plurality of collector electrodes 190' are located within anode volume 185. The plurality of collector electrodes 190' effectively repel electrons approaching anode support posts (not shown) and thus prevent premature collection of electrons on the posts. Thus, the electron path length is significantly increased compared to that in prior art gauges of the same size. Increasing the path length of electrons inside the anode volume 185 is highly desirable because increasing this portion of the path length increases the rate of ions created and, therefore, increases the gauge sensitivity proportionately. A plurality of collector electrodes is shown in U.S. Pat. Nos. 6,025,723; 6,046,456; and 6,198,105; the entire teachings of which are incorporated herein by reference.

In operation, molecules and atoms of gas enter the measurement chamber 120 through the partially open shield 220. The shield 220 prevents potentials external to the shield 220 from disturbing the electric charge distribution within the measurement chamber 120. The shield 220 is maintained at a reference potential. In one embodiment, the reference potential is ground potential.

The electron source(s) (for example, filaments) 140 generates electrons (represented by an electron beam 208) within the isolation chamber 110. The electrons are used in ionizing the gas molecules in the measurement chamber 120. The geometrical shape of the filament 140 can be a linear ribbon, a linear wire, a straight ribbon, a curved ribbon, a straight wire, a hairpin wire, or any other shape known in the art. In one embodiment, the filament 140 is resistively heated to incandescence with an electrical current from an emission regulator (not shown). The thermionically, or otherwise, emitted electrons are accelerated by acceleration electrodes 150 to an energy which allows the electrons to be transmitted through the electron window 160. The acceleration electrodes 150 operate at an electric potential so that the potential difference between the electron source and the acceleration electrodes is within a range from 100 volts to 10,000 volts depending upon the size, thickness and type of material used for the electron window. In one embodiment, the acceleration electrodes 150 are maintained at a potential difference from the electron source(s) around 1000 volts. The electron window can be made from aluminum such as described in J. R. Young, "Penetration of Electrons and Ions in Aluminum," *Journal of Applied Physics*, January 1956, the entire teachings of which are herein incorporated by reference.

The electrons must have their energy controlled to a desired level to allow for ionization to occur after the electrons have been transmitted through the electron window 160. Ionization occurs over an energy spread both higher and lower than the nominal design energy as described in Saul Dushman, *Scientific Foundations of Vacuum Technique*, 1962, the entire teachings of which are herein incorporated by reference. Ion formation typically occurs at an electron energy around 150 electron volts for nitrogen. Therefore, the energy of the electrons is modified by deceleration electrodes 170 to allow for ionization. The deceleration electrodes 170 operate at an electric potential so that the potential difference between the electron window and the deceleration electrodes are within a range from 0 volt to 10,000 volts depending upon the incident electron energy required by the size, thickness, and type of window and also the type of pressure measurement. For example, as shown in FIGS. 2A and 2B, the deceleration electrodes 170 are maintained at a potential which reduces the energy of the electrons so that they arrive at the anode grid 180 with an energy of about 150 electron volts.

The anode grid 180 defines an anode volume 185 and is charged to a positive 180 volts with reference to ground. The anode grid 180 can be made of a wire mesh or like design to allow the electrons to enter and exit the anode grid 180. Most electrons do not strike the anode grid 180 immediately but pass through the anode grid 180 and into the anode volume 185 where they create ions through electron impact ionization. The electrons which do not strike the anode grid 180 or ionize any molecules, pass through the anode volume 185 into the region between the anode grid 180 and the tube 205. There the electrons decelerate and re-accelerate back toward the grid 180 because of an electric field created between the tube 205 and the anode grid 180. The electrons continue circulating in this fashion until the electrons are collected by the anode grid 180 or lost to other surfaces. The multiple passes of electrons increase the ionization efficiency of the electron current relative to single pass configurations.

The ions, once created by electron impact ionization, tend to stay within the anode grid 180. The ions formed within the anode volume 185 are directed by the electric field produced by the potential difference between (a) the anode grid 180 at a potential that is positive with respect to ground and (b) the collector electrode(s) 190 (190') which is at a potential which is near ground potential (i.e., negative relative to the anode potential). The electric field directs the ions to the collector electrode(s) 190 (190') where they are collected to provide the ion current used to determine the pressure of the gas. In some embodiments, higher pressures can be measured using the outside collector electrode 210 which is very close to the window for capture of ions formed very close to the window, i.e., not inside the anode, due to short mean free paths at higher pressures.

Figure 3:
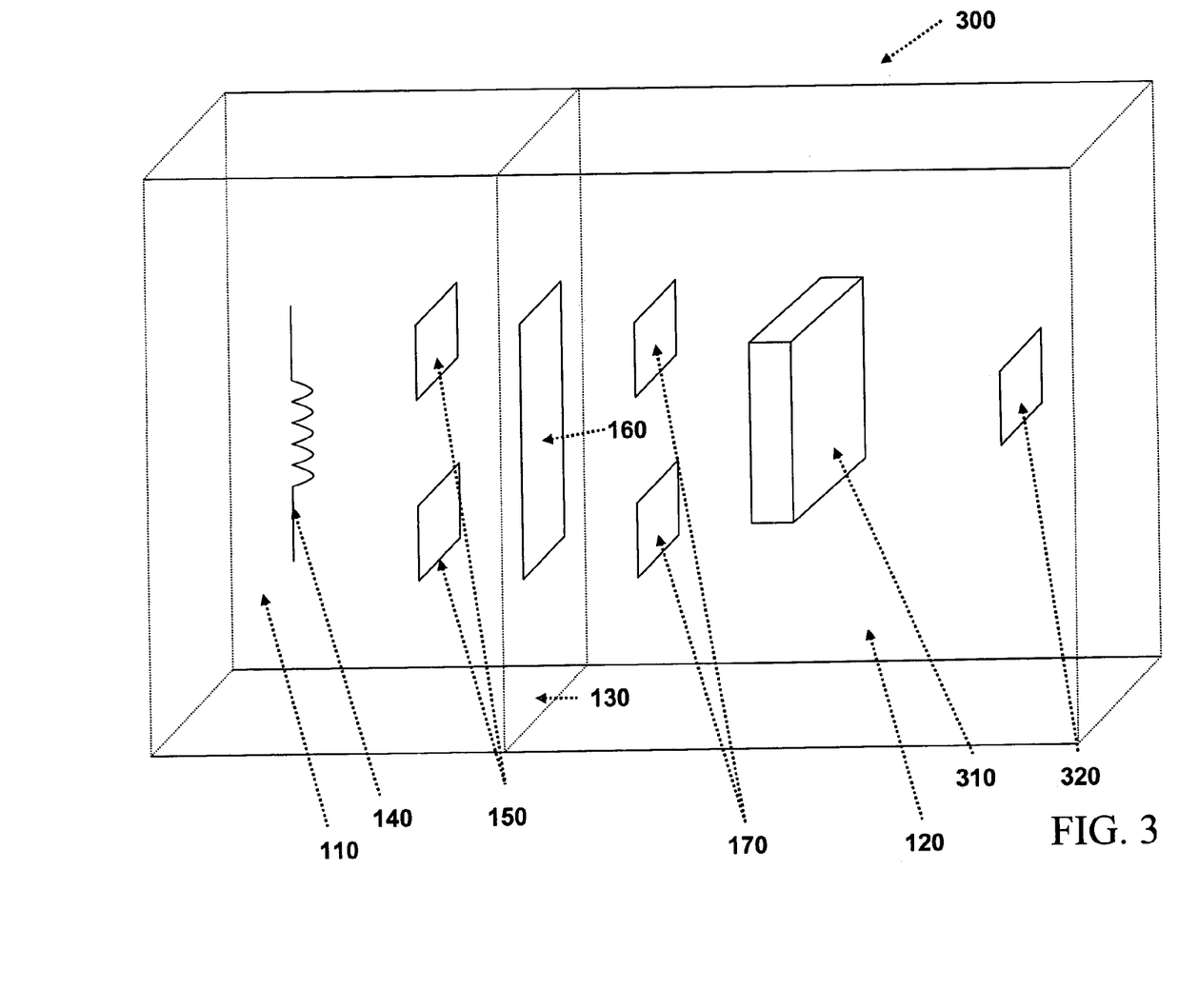
FIG. 3 is a schematic view of a generalized mass analyzer of the present invention.

FIG. 3 shows a residual gas analyzer (RGA) 300 embodying to the present invention. The RGA 300 and ionization gauges 100, 200 described above are essentially the same except the anode grid 180 and collector electrode 190 (190') of FIGS. 1, 2A, and 2B are replaced by a mass filter 310 and an ion detector 320.

In operation, molecules and atoms of gas enter the measurement chamber 120. The electron source(s) (for example, filaments) 140 generates electrons within the isolation chamber 110. The thermionically emitted electrons (or electrons produced via field emission, photoemission, plasma extraction, from a radioactive source, or otherwise) are accelerated by acceleration electrodes 150 to an energy which allows the electrons to be transmitted through the electron window 160. The electrons are used in ionizing the gas molecules and atoms in the measurement chamber 120.

The electrons must have their energy controlled to an appropriate level to allow for ionization to occur after the electrons have been transmitted through the electron window 160. The energy of the electrons is modified by deceleration electrodes 170 to allow for ionization.

The ions enter a mass filter 310 which separates the ions based on their mass-to-charge ratio (m/z). The mass filter 310 allows selected ions to move to the ion detector 320. The mass filter 310 filters the ions based on their mass-to-charge ratio. Only the ions that match the mass filter parameters are passed through the mass filter 310 at a given time. The ion detector 320 counts the ions and a signal is generated that is proportional to the total number of ions at each given time as noted just above. The signal is reported to a data system (not shown) which outputs the type of gas present.

Figure 4A:
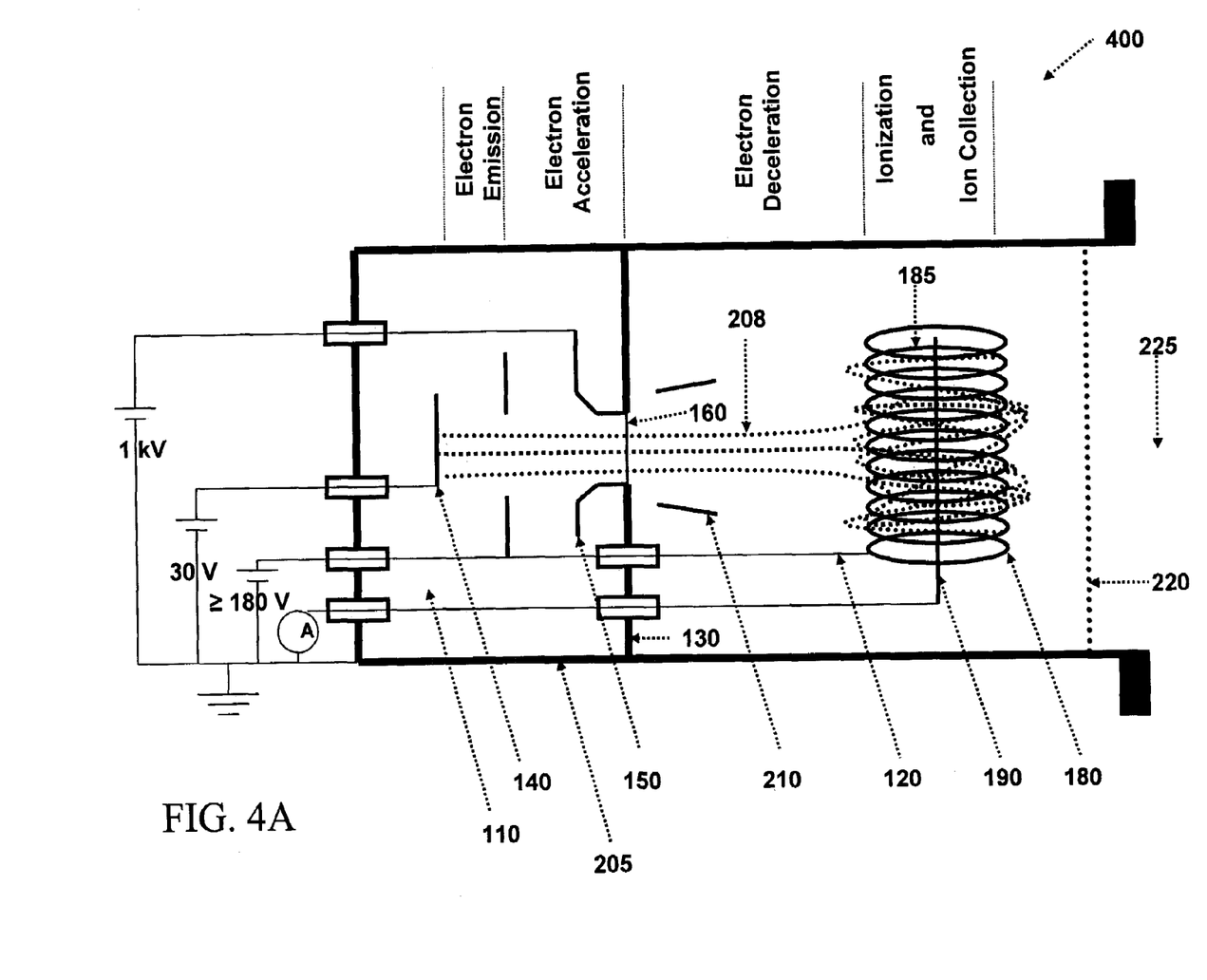
FIG. 4A is a detailed schematic view of another embodiment of the non-nude type ionization gauge of FIG. 2A.
Figure 4B:
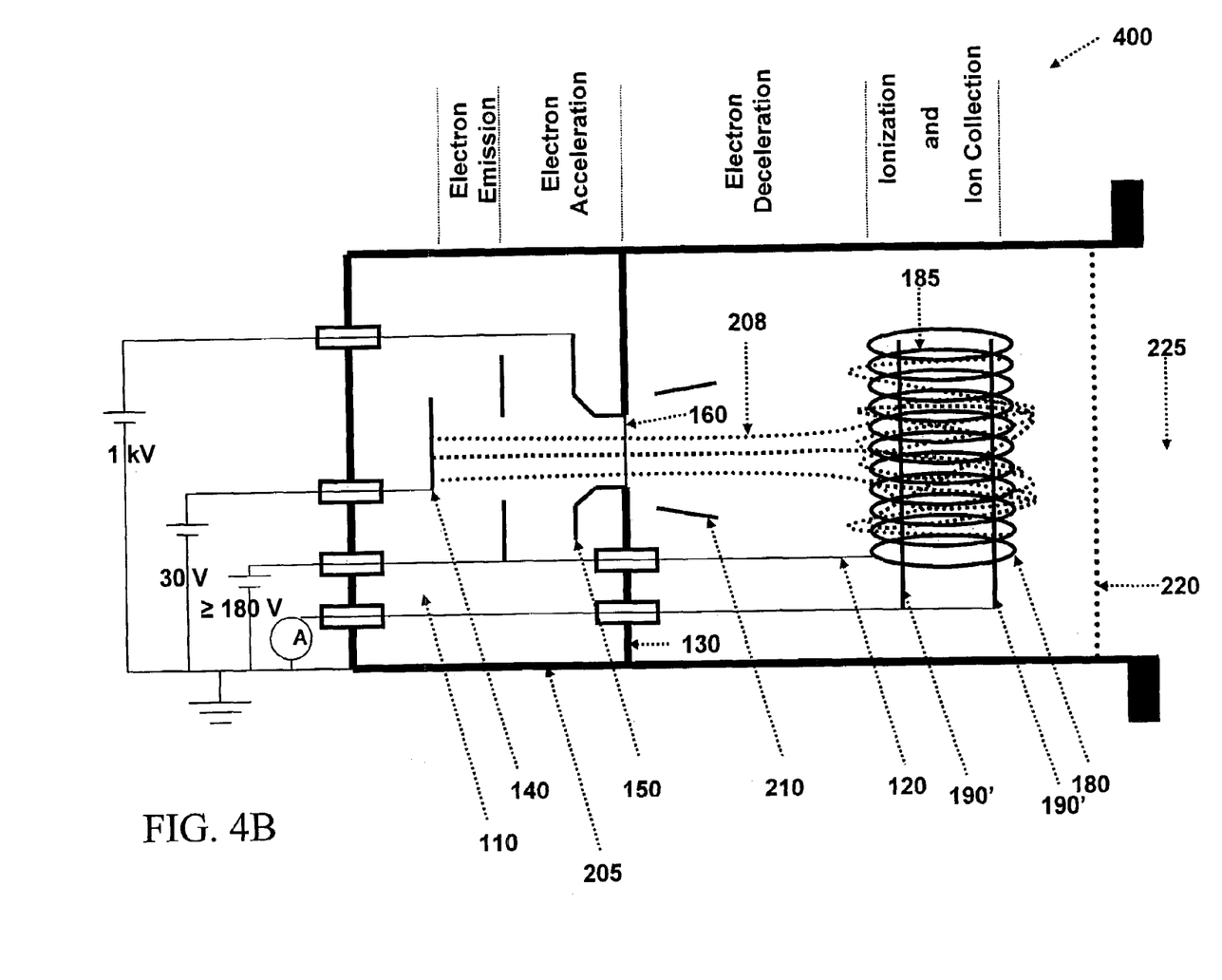
FIG. 4B is a detailed schematic view of another embodiment of FIG. 4A.

The ionization gauge 400 of FIGS. 4A and 4B have similar components to the ionization gauge 200 of FIGS. 2A and 2B, respectively, with the following exceptions. The deceleration electrodes 170 have been removed and their functionality has been replaced by anode 180, the anode 180 becoming the deceleration electrode.

The operation is similar to the operation as described with reference to FIGS. 2A and 2B. However, the anode 180 operates at an electric potential so that the potential difference between the electron window and the anode 180 is within a range from 10 volts to 10,000 volts depending upon the incident electron energy required by the size, thickness, and type of window and also the type of pressure measurement. For example, as shown in FIGS. 4A and 4B, the anode 180 is maintained at a potential which reduces the energy of the electrons so that they reach the anode volume 185 with an energy of about 150 electron volts. It should be understood that the 150 electron volts is the optimum for ionization, however the ionization thresholds starts at around 15 electron volts.

While this invention has been particularly shown and described with references to preferred embodiments thereof, it will be understood by those skilled in the art that various changes in form and details may be made therein without departing from the scope of the invention encompassed by the appended claims.

What is claimed is:

1. An ionization gauge, comprising:
   an electron source for generating electrons;
   a collector electrode for collecting ions formed by the impact between the electrons and gas molecules;
   an electron window which isolates the electron source from the gas molecules; and
   an anode between the electron window and the collector electrode, the anode surrounding the collector electrode.

2. The ionization gauge of claim 1, further comprising:
   an acceleration electrode between the electron source and the electron window to accelerate the electrons to an energy which allows the electrons to be transmitted through the electron window.

3. The ionization gauge of claim 2, wherein the acceleration electrode includes a plurality of acceleration electrodes.

4. The ionization gauge of claim 2, where the acceleration electrode is maintained at an electric potential so that the potential difference between the electron source and the acceleration electrode is at a range of 100 volts to 10,000 volts.

5. The ionization gauge of claim 1, where the anode is maintained at an electric potential so that the potential difference between the electron window and the anode is at a range of 10 volts to 10,000 volts.

6. The ionization gauge of claim 1, further comprising:
   a shield defining a shielded volume, the shield being at least partially open to permit transfer of the gas molecules into the shielded volume.

7. The ionization gauge of claim 1, where the gauge is a pressure gauge.

8. The ionization gauge of claim 1, where the gauge is of the Bayard-Alpert type.

9. The ionization gauge of claim 1, wherein the anode retains the electrons in a region of the anode.

10. A method of measuring a gas pressure from gas molecules and atoms, comprising the steps of:
    producing electrons at an electron source;
    transmitting the electrons through an electron window, the electron window isolating the electron source from the gas molecules;
    retaining electrons from the electron source within a surrounding anode;
    collecting ions formed by impact between the decelerated electrons and the gas molecules and atoms on the collector electrode.

11. The method of claim 10, where the anode is maintained at an electric potential so that the potential difference between the electron window and the anode is at a range of 10 volts to 10,000 volts.

12. The method of claim 10, where the step of transmitting the electrons includes using an acceleration electrode, accelerating the electrons to an energy which allows the electrons to be transmitted through the electron window.

13. The method of claim 12, where using an acceleration electrode includes using a plurality of acceleration electrodes to accelerate the electrons to an energy which allows the electrons to be transmitted through the electron window.

14. The method of claim 12, where the acceleration electrode is maintained at an electric potential so that the potential difference between the electron source and the acceleration electrode is at a range of 100 volts to 10,000 volts.

15. An ionization gauge, comprising:
    an electron source for generating electrons;
    a collector electrode for collecting ions formed by the impact between the electrons and gas molecules;

an electron window which isolates the electron source from the gas molecules; and an electrode between the electron window and the collector electrode that decelerates the electrons.

16. The ionization gauge of claim 15, wherein the electrode is an anode defining an anode volume, the anode surrounding the collector electrode.

17. The ionization gauge of claim 16, where the anode is maintained at an electric potential so that the potential difference between the electron window and the anode is at a range of 10 volts to 10,000 volts.

18. The ionization gauge of claim 15, further comprising:
an acceleration electrode between the electron source and the electron window to accelerate the electrons to an energy which allows the electrons to be transmitted through the electron window.

19. The ionization gauge of claim 18, where the acceleration electrode is maintained at an electric potential so that the potential difference between the electron source and the acceleration electrode is at a range of 100 volts to 10,000 volts.

20. The ionization gauge of claim 15, further comprising:
a shield defining a shielded volume, the shield being at least partially open to permit transfer of the gas molecules into the shielded volume.

* * * * *